United States Patent [19]
Doolittle et al.

[11] Patent Number: 5,309,783
[45] Date of Patent: May 10, 1994

[54] SIMPLIFIED AUTOMATIC TRANSMISSION SHIFTER

[75] Inventors: Miles G. Doolittle, Royal Oak, Mich.; Anthony R. Gurney, Toledo, Ohio; Stephanie J. Riffle, Hartland; Arnold Schultes, Shelby Township, Macomb County, both of Mich.

[73] Assignee: Dura Mechanical Components, Inc., Troy, Mich.

[21] Appl. No.: 831,982

[22] Filed: Feb. 6, 1992

[51] Int. Cl.$^5$ ............................ G05G 9/12; F16C 11/06
[52] U.S. Cl. ..................................... 74/473 P; 74/475; 74/495; 74/523; 192/4 A
[58] Field of Search .................. 74/473 P, 475, 491, 74/495, 523; 192/4 A

[56] References Cited

U.S. PATENT DOCUMENTS

| | | | |
|---|---|---|---|
| 4,326,432 | 4/1982 | Miller | 74/475 |
| 4,333,360 | 6/1982 | Simmons | 74/473 P |
| 4,365,522 | 12/1982 | Kubota et al. | 74/475 |
| 4,473,141 | 9/1984 | Mochida | 74/475 X |
| 4,565,151 | 1/1986 | Buma | 74/473 R |
| 4,612,820 | 9/1986 | Behrens | 74/475 |
| 4,850,238 | 7/1989 | Inoue | 74/473 R |
| 4,873,884 | 10/1989 | Yamada et al. | 74/473 P |
| 4,986,143 | 1/1991 | Livshits et al. | 74/475 |
| 4,991,460 | 2/1991 | Shirahama et al. | 74/473 P X |
| 5,044,221 | 9/1991 | Suzuki et al. | 74/473 R |
| 5,062,509 | 11/1991 | Carpenter et al. | 194/4 |
| 5,078,242 | 1/1992 | Ratke et al. | 192/4 A |
| 5,079,966 | 1/1992 | Ishizuki et al. | 74/473 R |
| 5,080,208 | 1/1992 | Sakuma et al. | 74/475 X |

FOREIGN PATENT DOCUMENTS 7608435 11/1977 Netherlands ................. 74/473 P

*Primary Examiner*—Leslie A. Braun
*Assistant Examiner*—Andrea Pitts
*Attorney, Agent, or Firm*—David A. Greenlee

[57] ABSTRACT

An automatic transmission shifter for a vehicle comprises a unitary glass reinforced nylon housing open at the bottom and having interconnected, spaced upper, side and end walls. A slot is formed in the upper wall, a pair of spaced aligned apertured bosses are formed in the side walls, and integral flanges extend from the side and end walls and incorporate a plurality of spaced apertures for mounting the housing to vehicle structure. A pair of spaced, aligned position control plates, each comprising a plurality of notches, are formed interiorly on the side walls, a plurality of detent notches are formed interiorly on the housing on one of the side walls below the position control plates, and a shift cable access opening is formed in one of the end walls. A shift lever assembly including an operating lever extends upwardly through the slot. A plastic trunnion mounts the lever and a pivot pin carried by the boss apertures mounts the trunnion for pivotal movement of the lever among a plurality of transmission control positions. The ends of a position pin mounted centrally on the shift lever simultaneously engage notches in each position control plate to control lever movement between positions. A spring-biased detent ball mounted on the trunnion engages in the detent notches to locate the lever in each of the control positions.

20 Claims, 3 Drawing Sheets

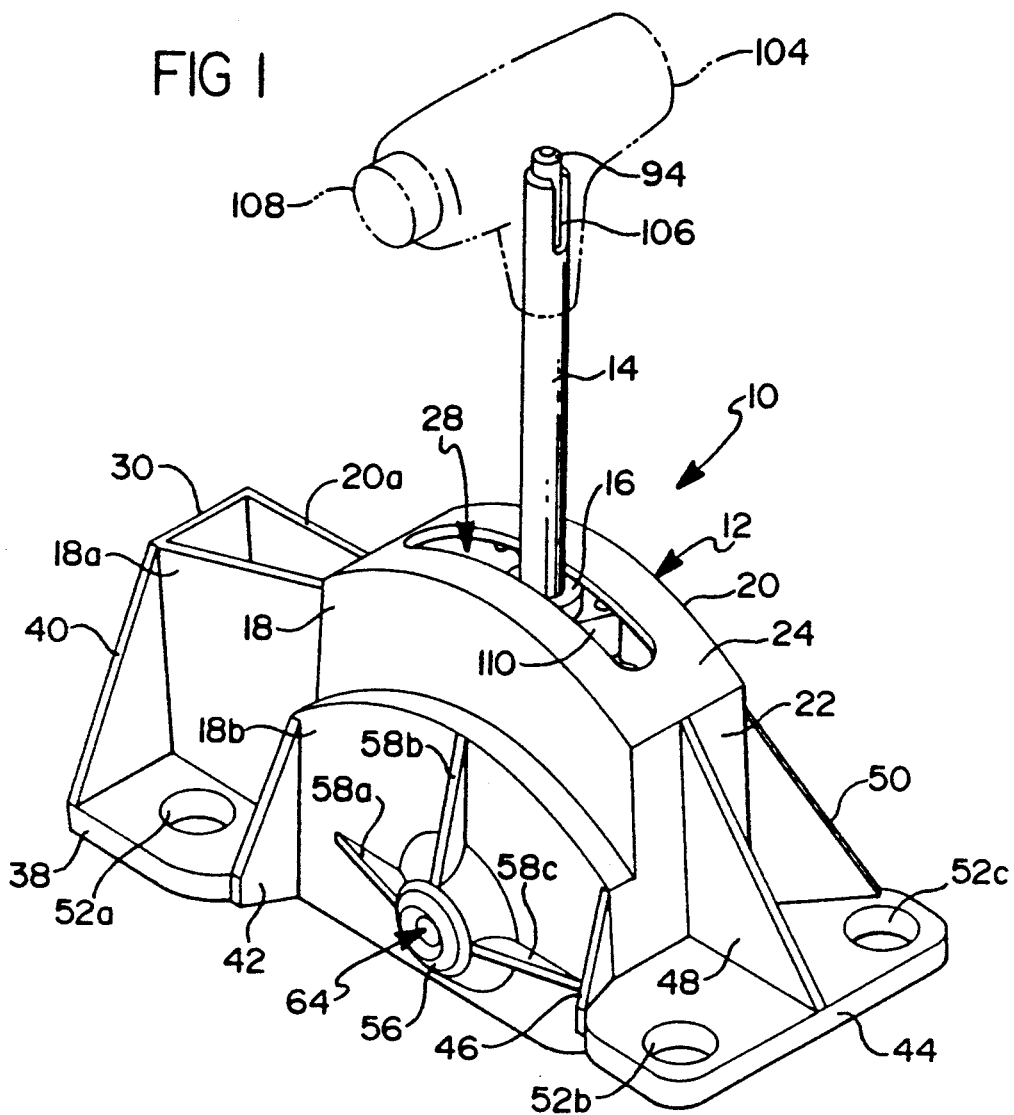
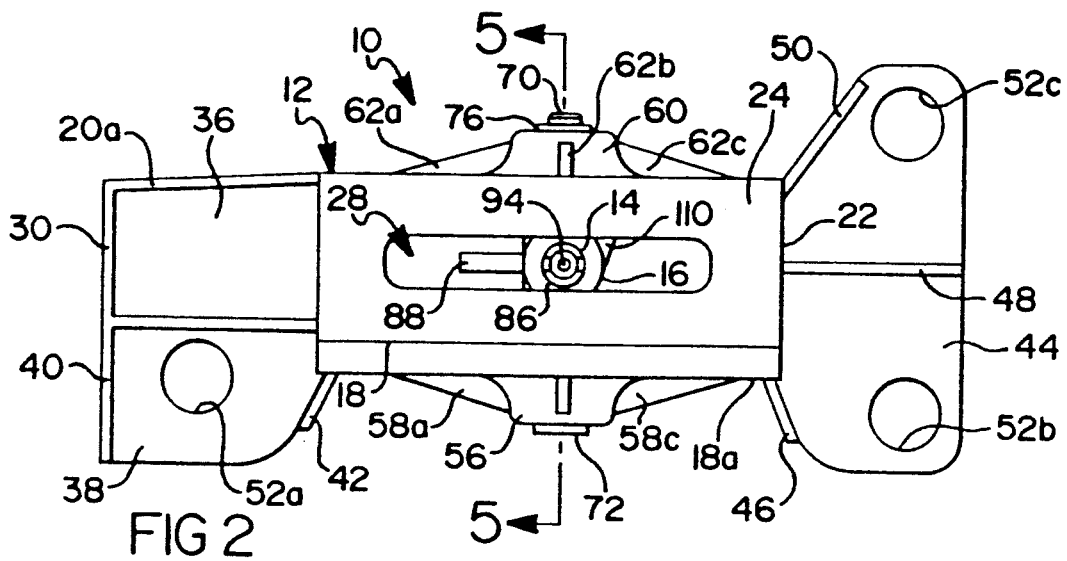

U.S. Patent  May 10, 1994  Sheet 2 of 3  5,309,783
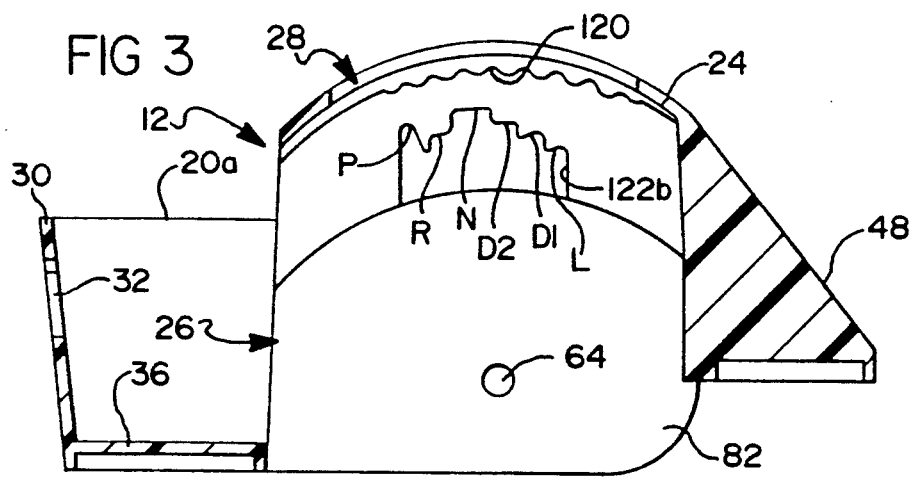
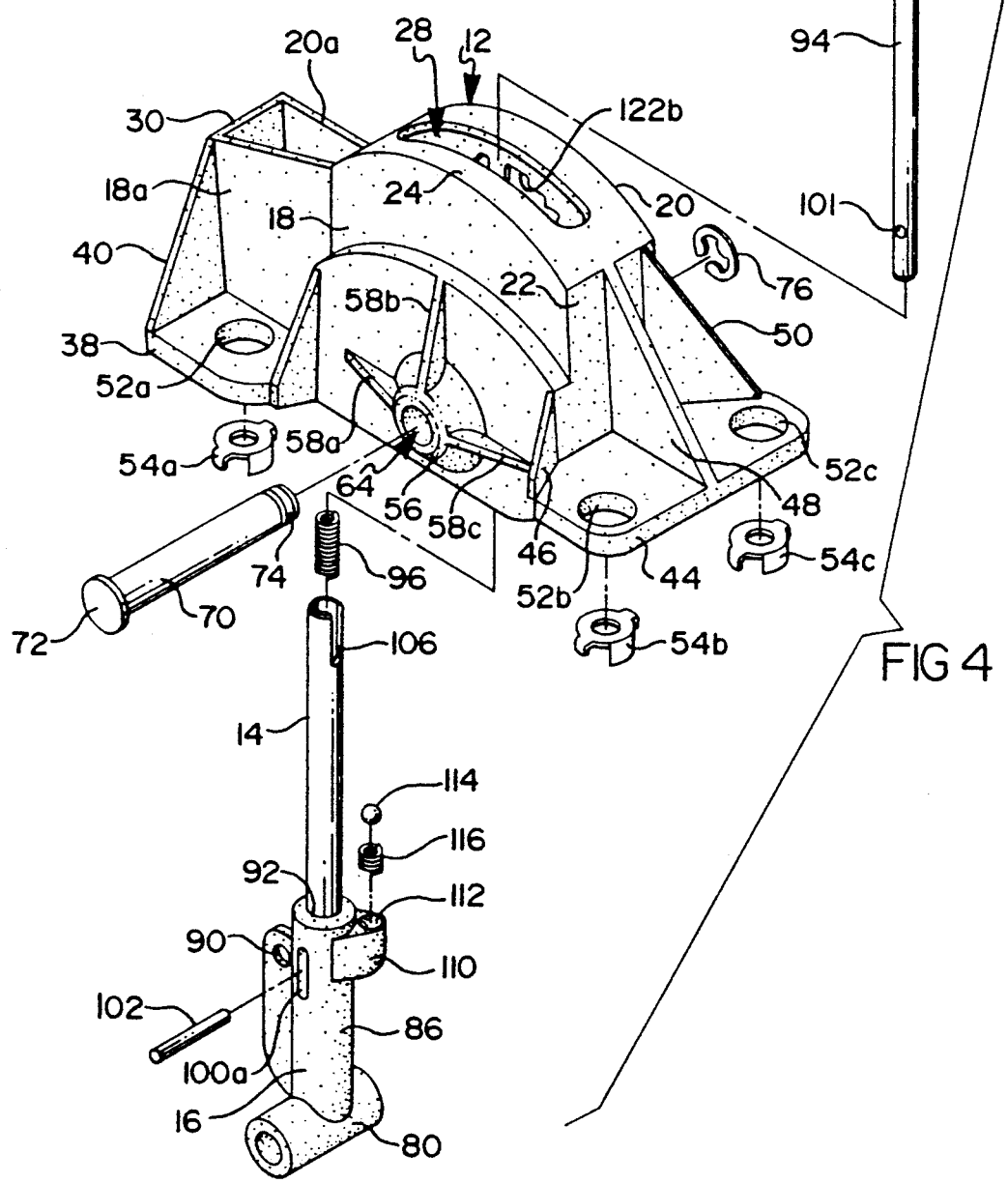
FIG 3
FIG 4

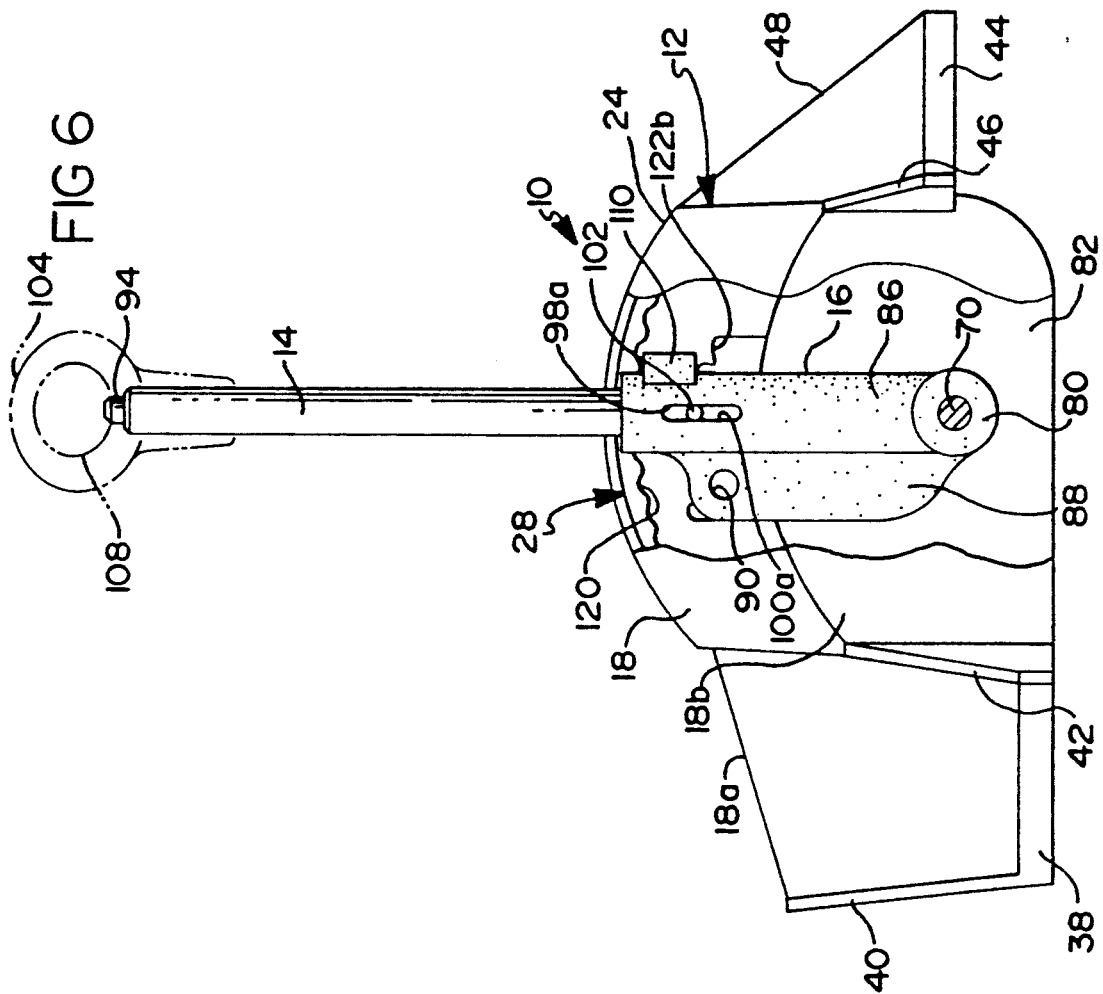

SIMPLIFIED AUTOMATIC TRANSMISSION SHIFTER

BACKGROUND OF THE INVENTION

This invention relates generally to vehicle transmission control shifters and, more particularly, to a shifter for controlling an automatic transmission.

Conventional automatic transmission shifters comprise a metal or plastic mounting bracket which mounts a pivoted shift lever for shifting the transmission among a plurality of discrete control positions. The bracket mounts a plastic or metal cover that has a slot for the shift lever that is usually flanked by a PRNDL transmission control position indicator.

A shift control plate engaged by a lever-mounted position pin is usually provided to restrict movement of the lever between the control positions. A metal "rooster comb" comprising a series of detent notches and a cooperating spring-biased follower are provided to locate the lever in these positions.

Most controls are mechanical, with the lever operating a Bowden cable connected to the transmission. Some controls are electronic and include a switch operated by the control lever which must have an insulated mounting.

These conventional shifters are unduly complex and expensive to manufacture, comprising 20 to 50 or more separate component pieces which must be manually assembled.

Accordingly, it is desirable to provide a simpler automatic transmission shifter mechanism that comprises fewer component pieces and is simpler and less expensive to manufacture.

SUMMARY OF THE INVENTION

It is therefore an object of this invention to provide a simpler automatic transmission shifter mechanism that comprises fewer component pieces and is simpler and less expensive to manufacture.

This invention accomplishes this object by combining many of the component parts into a single, plastic housing that is injection molded in one piece.

In one aspect, this invention features a housing for an automatic transmission shifter comprising a unitary piece of plastic open at the bottom and having spaced upper, side and end walls, a slot formed in the upper wall for receiving a shifter control lever therethrough, a pair of aligned bosses formed in the side walls for mounting a shift lever pivot pin, and flanges extending from the side and end walls for mounting the housing to vehicle structure.

In another aspect, this invention features a housing for an automatic transmission shifter comprising a unitary piece of plastic open at the bottom and having spaced upper, side and end walls, a slot formed in the upper wall for receiving a shifter control lever therethrough, a pair of aligned apertured bosses formed in the side walls for mounting a shift lever pivot pin, flanges extending from the side and end walls incorporating a plurality of spaced apertures for mounting the housing to vehicle structure, position control means defining a plurality of discrete transmission control positions formed interiorly on the housing, and a plurality of detent notches formed interiorly on the housing.

In yet another aspect, this invention features such a housing wherein the position control means comprise a pair of spaced, aligned position control plates incorporating a series of downwardly-open notches formed on the side walls, and the detent notches are formed on one of the side walls adjacent one of the position control plates.

In still another aspect, this invention features an automatic transmission shifter for a vehicle comprising a unitary plastic housing open at the bottom and having interconnected spaced upper, side and end walls, a slot in the upper wall and a pair of aligned, spaced apertured bosses in the side walls; a shift lever assembly including an operating lever extending upwardly through said slot; and a pivot pin carried by the boss apertures mounting the lever assembly within the housing for pivotal movement among a plurality of transmission control positions.

In a further aspect, this invention features an automatic transmission shifter for a vehicle comprising a unitary plastic housing open at the bottom and having interconnected spaced upper, side and end walls, a slot in the upper wall and a pair of spaced aligned apertured bosses formed in the side walls; a shift lever assembly including an operating lever extending upwardly through said slot and a plastic trunnion mounting the lever; and a pivot pin carried by the boss apertures mounting the trunnion within the housing for movement of the lever among a plurality of transmission control positions.

In a yet further aspect, this invention features an automatic transmission shifter for a vehicle comprising a unitary plastic housing open at the bottom and having interconnected spaced upper, side and end walls. A slot is formed in the upper wall, a pair of spaced aligned apertured bosses are formed in the side walls, and integral flanges extend from the side and end walls and incorporate a plurality of spaced apertures for mounting the housing to vehicle structure. A pair of spaced, aligned position control plates each comprising a plurality of notches are formed interiorly on the side walls, a plurality of detent notches are formed interiorly on the housing on one of the side walls above the position control plates, and a shift cable access opening formed in one of the end walls. A shift lever assembly including an operating lever extends upwardly through the slot. A plastic trunnion mounts the lever and a pivot pin carried by the boss apertures mounts the trunnion for pivotal movement of the lever among a plurality of transmission control positions. The ends of a position pin mounted centrally on the shift lever simultaneously engage notches in each position control plate to control lever movement between positions. A spring-biased detent ball mounted on the trunnion engages in the detent notches to locate the lever in each of the control positions.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 1 is a perspective view of an automatic transmission shifter, according to this invention;

FIG. 2 is a plan view of the shifter shown in FIG. 1;

FIG. 3 is a longitudinal sectional view of the shifter housing, according to this invention;

FIG. 4 is an exploded perspective view of the shifter;

FIG. 5 is a lateral sectional view of the shifter, taken along 5—5 of FIG. 2; and FIG. 6 is a side elevation of the shifter, partially broken away to show details of the shifter.

DETAILED DESCRIPTION OF A PREFERRED EMBODIMENT

Referring now to FIGS. 1, 2 and 4, an automatic transmission shifter 10 comprises a housing 12, and a shift lever 14 mounted in a trunnion 16. Housing 12 is preferably a unitary piece of glass filled nylon or polyester made by injection molding. The housing 12 includes a pair of upstanding side walls 18 and 20 which are interconnected by an end wall 22 and a curved upper wall 24 which define a main chamber open at the bottom, as shown in FIG. 3. Upper wall 24 and side walls 18 and 20 define a shifter cable access opening 26.

Upper wall 24 includes an elongated slot 28 through which shift lever 14 extends for movement between transmission control positions, as later described. Side walls 18 and 20 include integral extensions 18a and 20a which terminate in an interconnecting end wall 30, forming a box-like structure which reinforces that end of housing 12. End wall 30 includes a keyhole-shaped shifter cable mounting opening 32.

End wall extensions 18a, 20a and end wall 30 are preferably closed at their bottoms by a bottom wall 36. Bottom wall 36 extends outwardly of end wall extension 18a to form a mounting flange 38 that is supported at one end by a triangular strengthening rib 40 which extends from end wall 30. At its other end, mounting flange 38 is strengthened by rib 42 which extends angularly from the stepped lower portion 18b of side wall 18.

Another mounting flange 44 extends outwardly from the bottom of end wall 22 at the other end of housing 12. Flange 44 is strengthened by a rib 46 extending from stepped side wall portion 18b, a rib 48 extending centrally from end wall 22, and a rib 50 extending angularly from side wall 20.

Mounting apertures 52a and 52b, 52c are formed in mounting flanges 38 and 44, respectively. Mounting inserts 54a, 54b and 54c are press fit in apertures 52a, 52b and 52c to provide for mounting to a vehicle floor or other structure by bolts or other conventional fasteners.

Wall segment 18b contains an integral apertured boss 56 supported by three strengthening ribs 58a, 58b and 58c. The lower portion of opposing side wall 20 contains a like apertured boss 60 having three similar strengthening ribs 62a, 62b and 62c, as shown in FIG. 2.

As shown in FIGS. 2, 4 and 5, the through bore 64 in bosses 56 and 60 mounts a pivot pin 70 which has an enlarged head 72 at one end engaging boss 56. The distal end of pivot pin 70 includes an annular groove 74 which receives a snap ring, also known as an E-clip or a circlip, 76, which engages boss 60. Interiorly of housing 12, pivot pin 70 pivotally confines the hub 80 of the plastic trunnion 16 between the inner surfaces 82 and 84 of respective side walls 18 and 20.

As best seen in FIGS. 4 and 6, trunnion 16 includes a cylindrical main body 86 which incorporates a vertical rib 88 containing an aperture 90 for attachment of a conventional shift control cable, not shown. Referring additionally to FIG. 5, main body 86 contains a central bore 92 which secures the lower end of shift control lever 14, that is bored to slidably receive a release rod 94 and a biasing spring 96. Lever 14 includes aligned slots 98a, 98b which register with similar slots 100a, 100b in trunnion 16.

Release rod 94 includes a horizontal bore that receives a position control pin 102. Spring 96 biases rod 94 and pin 102 upwardly of lever 14. A conventional shifter knob 104 (shown in phantom in FIGS. 1 and 6) is mounted on the upper end of lever 14 in a slot 106 and includes a release button 108. Manual depression of button 108 cams release rod 94 downward within lever 14 against the force of spring 96 in a well-known manner. This causes position pin 102 to move downward within the confines of slots 98a, 98b and 100a, 100b.

The main body portion 86 of trunnion 16 includes an offset boss 110 at its upper end that has a vertical bore 112 which receives a detent follower in the form of a ball 114 and its biasing spring 116. As shown best in FIGS. 3, 5 and 6, a rib comprising a plurality of downwardly open detent notches, known collectively as a "rooster comb", 120 is formed at the juncture of upper wall 24 and side wall 20. When the shifter 10 is assembled, detent ball 114 is biased into engagement with the notches of rooster comb 120 by spring 116.

The interior wall surfaces 82 and 84 contain matching, aligned shift control plates (often misleadingly known as "detent notches") 122a, 122b formed as cutouts in their surfaces and which open downwardly. These control plates 122a, 122b comprise a series of different height notches corresponding to the transmission control positions.

The notches of plate 122b illustrated in FIG. 3 correspond to P (park), R (reverse), N (neutral), D2 (drive 2), D1 (drive 1), and L (low) transmission control positions. Similar notches are provided in plate 122a. The outer surface of upper wall 24 adjacent slot 28 will mount the conventional "PRNDL" plate (not shown) which indicates the transmission control positions occupied by shift control lever 14.

With the shift lever in the park position, spring 96 biases position pin 102 into the P notches of the position control plates 122a, 122b. Simultaneously, spring 116 biases ball 114 into engagement with a corresponding detent notch in rooster comb 120 to locate shift lever 14 in the P position. To move lever 14 to the R position, button 108 must be pushed to depress shift rod 94 sufficiently so that pin 102 moves below the cusp between the P and R positions. Some manual effort will be required to force the detent notch wall to cam ball 114 from its detent notch to the next notch corresponding to shifter plate control notch R.

Shift lever 14 can be moved to the N position without pushing button 108, although manual force will be required to cam ball 114 to the next detent notch. Movement to the D position is again accomplished by merely moving lever 14, while rod 94 must be depressed by pushing button 108 for subsequent movement to each of the D2, D1 and L positions. Reverse movement of lever 14 from L to D1 and D2 and N does not require pressing button 108, while movement from N to R and P does.

It will be noted from FIG. 3 that housing 12 is designed to enable injection molding with the use of only two slide pins for the cable mounting hole 32 and the pivot pin through bore 64. This design and construction greatly simplify the manufacture of shifter 10 through the use of a single molded plastic housing to replace the usual myriad bits and pieces of metal and plastic which plague conventional shifters.

The basic shifter assembly illustrated comprises only 10 major pieces: housing, trunnion, shift lever, release rod, pivot pin, spring clip, two springs, detent ball and position pin. Additionally required are only three fasteners (the mounting bolts), three mounting aperture inserts (if desired), the shifter knob, and a decorative cover which can include the PRNDL.

The illustrated shifter constructions also is inherently quiet, since metal-to-metal interfaces are replaced by metal-to-plastic contact. This occurs by providing an opposing plastic surface for the pivot pin, the detent ball, and the position pin.

While only a preferred embodiment has been illustrated and described, obvious modifications thereof are contemplated within the scope of this invention and the following claims.

We claim:

1. A housing for an automatic transmission shifter comprising a unitary piece of plastic having spaced upper, side and end walls and a bottom having an opening, said walls defining a housing interior surface, a straight-sided slot formed in the upper wall for receiving a shifter control lever therethrough, a pair of aligned bosses formed in the side walls for mounting a shift lever pivot pin, position control means defining a plurality of discrete transmission control positions formed on the interior surface of the housing, and flanges extending from the side and end walls for mounting the housing to vehicle structure wherein the shift control lever can only move unilinearly along said slot.

2. The housing of claim 1, wherein the position control means comprise a position control plate having a series of downwardly-open notches formed on the interior surface of a housing side wall.

3. The housing of claim 2, further including a plurality of detent notches formed on the interior surface of the housing.

4. The housing of claim 3, wherein the detent notches are formed on one of the side walls adjacent the position control plate.

5. The housing of claim 4, further including a shift cable mounting hole formed in one of the end walls.

6. The housing of claim 5, having a main chamber open at the bottom and defined by the upper wall, an end wall and the side walls, the side walls and upper wall defining an intermediate cable access opening, the side walls including integral extensions connecting to the other end wall, and including a bottom wall coextensive with the side wall extensions to define an open-top box-like reinforcing structure auxiliary to the main chamber.

7. The housing of claim 4, further including means for mounting a transmission position control switch on the interior surface of the housing.

8. The housing of claim 1, wherein the position control means comprise a pair of spaced, aligned position control plates incorporating a series of downwardly-open notches formed on the interior surface of the side walls.

9. The housing of claim 1, further including a plurality of detent notches formed on the interior surface of the housing.

10. The housing of claim 9, wherein the detent notches are formed on one of the side walls.

11. The housing of claim 1, formed of glass fiber reinforced plastic material.

12. The housing of claim 1, formed of glass fiber reinforced nylon.

13. A housing for an automatic transmission shifter comprising a unitary piece of plastic having spaced upper, side and end walls and a bottom having an opening, said walls defining a housing interior surface, a straight-sided slot formed in the upper wall for receiving a shifter control lever therethrough, a pair of aligned apertured bosses formed in the side walls for mounting a shift lever pivot pin, flanges extending from the side and end walls incorporating a plurality of spaced apertures for mounting the housing to vehicle structure, a position control plate defining a plurality of discrete transmission control positions formed on the interior surface of the housing, and a plurality of detent notches formed on the interior surface of the housing wherein the shift control lever can only more unilinearly along said slot.

14. An automatic transmission shifter for a vehicle comprising a unitary plastic housing having interconnected spaced upper, side and end walls and a bottom having an opening, said walls defining a housing interior surface, a slot in the upper wall and a pair of spaced aligned apertured bosses formed in the side walls; a shift lever assembly including an operating lever extending upwardly through said slot and a plastic trunnion mounting the lever; a plurality of detent notches formed on the interior surface of the housing and a spring-biased detent member mounted on the trunnion for locating the lever in each of the control positions; and a pivot pin carried by the boss apertures mounting the trunnion within the housing for unilinear movement of the lever along said slot among a plurality of transmission control positions.

15. The shifter of claim 14, including position control means formed on the interior surface of the housing and having notches corresponding to the control positions, a position pin mounted on the shift lever assembly movable into and out of the notches, a spring biasing the position pin into the notches, and a release rod carried by the shift lever for moving the position pin out of the notches.

16. The shifter of claim 15, wherein the position control means comprise a pair of spaced, aligned position control plates each comprising the plurality of notches formed on the side walls, the position pin being mounted centrally on the shift lever with its end simultaneously engaging notches in each position control plate.

17. The shifter of claim 16, including a plurality of detent notches formed on the interior surface of the housing on one of the side walls above the position control plates and a spring-biased detent member mounted on the trunnion for locating the lever in each of the control positions.

18. The shifter of claim 17, wherein the trunnion includes a transverse bore receiving the pivot pin, a vertical bore receiving the shift lever, and a boss offset from the vertical bore having a vertical slot mounting the spring-biased detent member.

19. The shifter of claim 18, wherein the spring-biased detent member comprises a ball and a spring biasing the ball upward into contact with the housing detent notches.

20. An automatic transmission shifter for a vehicle comprising a unitary plastic housing having interconnected spaced upper, side and end walls and a bottom having an opening, a slot in the upper wall, a pair of spaced aligned apertured bosses formed in the side walls, flanges extending from the side and end walls incorporating a plurality of spaced apertures for mounting the housing to vehicle structure, a pair of spaced, aligned position control plates each comprising a plurality of notches formed interiorly on the side walls, a plurality of detent notches formed interiorly on the housing on one of the side walls above the position control plates, and a shift cable mounting hole formed in one of the end walls; a shift lever assembly including an operating lever extending upwardly through said slot and a plastic trunnion mounting the lever; a pivot pin carried by the boss apertures mounting the trunnion within the housing for movement of the lever among a plurality of transmission control positions, a position pin mounted centrally on the shift lever with its ends simultaneously engaging notches in the position control plates to control movement of the lever between positions, and a spring-biased detent member mounted on the trunnion engaging the detent notches to locate the lever in each of the control positions.

* * * * *